(12) United States Patent
Broomer et al.

(10) Patent No.: US 8,235,652 B2
(45) Date of Patent: Aug. 7, 2012

(54) TURBINE NOZZLE SEGMENT

(75) Inventors: Mark Broomer, Boston, MA (US);
Victor Hugo Silva Correia, Milton Mills, NH (US)

(73) Assignee: General Electric Company, Schenectady, NY (US)

( * ) Notice: Subject to any disclaimer, the term of this patent is extended or adjusted under 35 U.S.C. 154(b) by 1145 days.

(21) Appl. No.: 11/967,177

(22) Filed: Dec. 29, 2007

(65) Prior Publication Data

US 2009/0169360 A1 Jul. 2, 2009

(51) Int. Cl.
*F01D 9/06* (2006.01)

(52) U.S. Cl. ....................................... 415/115

(58) Field of Classification Search .................... 415/116
See application file for complete search history.

(56) References Cited

U.S. PATENT DOCUMENTS

| 4,353,679 | A | * | 10/1982 | Hauser | 415/115 |
| 5,197,852 | A | * | 3/1993 | Walker et al. | 415/115 |
| 5,224,822 | A | * | 7/1993 | Lenahan et al. | 415/189 |
| 2002/0159880 | A1 | * | 10/2002 | Morris et al. | 415/115 |
| 2009/0165301 | A1 | | 7/2009 | Broomer et al. | |

* cited by examiner

*Primary Examiner* — Richard Edgar
(74) *Attorney, Agent, or Firm* — General Electric Company; David J. Clement; William Scott Andes

(57) ABSTRACT

A turbine nozzle segment includes a band having a flowpath side and a non-flowpath side and an enclosure disposed on the non-flowpath side of the band. A plenum may be defined between the band and the enclosure and a discourager may extend from the enclosure.

14 Claims, 7 Drawing Sheets

TURBINE NOZZLE SEGMENT

BACKGROUND OF THE INVENTION

The exemplary embodiments relate generally to gas turbine engine components and more particularly to turbine nozzle segments having improved cooling.

Gas turbine engines typically include a compressor, a combustor, and at least one turbine. The compressor may compress air, which may be mixed with fuel and channeled to the combustor. The mixture may then be ignited for generating hot combustion gases, and the combustion gases may be channeled to the turbine. The turbine may extract energy from the combustion gases for powering the compressor, as well as producing useful work to propel an aircraft in flight or to power a load, such as an electrical generator.

The turbine may include a stator assembly and a rotor assembly. The stator assembly may include a stationary nozzle assembly having a plurality of circumferentially spaced apart airfoils extending radially between inner and outer bands, which define a flow path for channeling combustion gases therethrough. Typically the airfoils and bands are formed into a plurality of segments, which may include one or two spaced apart airfoils radially extending between an inner and an outer band. The segments are joined together to form the nozzle assembly.

The rotor assembly may be downstream of the stator assembly and may include a plurality of blades extending radially outward from a disk. Each rotor blade may include an airfoil, which may extend between a platform and a tip. Each rotor blade may also include a root that may extend below the platform and be received in a corresponding slot in the disk. Alternatively, the disk may be a blisk or bladed disk, which may alleviate the need for a root and the airfoil may extend directly from the disk. The rotor assembly may be bounded radially at the tip by a stationary annular shroud. The shrouds and platforms (or disk, in the case of a blisk) define a flow path for channeling the combustion gases therethrough.

As gas temperatures rise due to the demand for increased performance, components may not be able to withstand the increased temperatures. Higher gas temperatures lead to higher metal temperatures, which is a primary contributor to distress. Bands are susceptible to this distress, in particular, on the aft side of the bands. Distress may cause cracking or holes to form within these areas, leading to decreased performance and higher repair costs.

BRIEF DESCRIPTION OF THE INVENTION

In one exemplary embodiment, a turbine nozzle segment may have a band having a flowpath side and a non-flowpath side and an enclosure disposed on the non-flowpath side of the band. A plenum may be defined between the band and the enclosure and a discourager may extend from the enclosure.

In another exemplary embodiment, a turbine nozzle segment may have a band having a radially extending flange and an enclosure associated with the band. A plenum may be defined between the enclosure and band and a hole having an outlet into the plenum may extend through the flange.

DETAILED DESCRIPTION OF THE INVENTION

Figure 1:
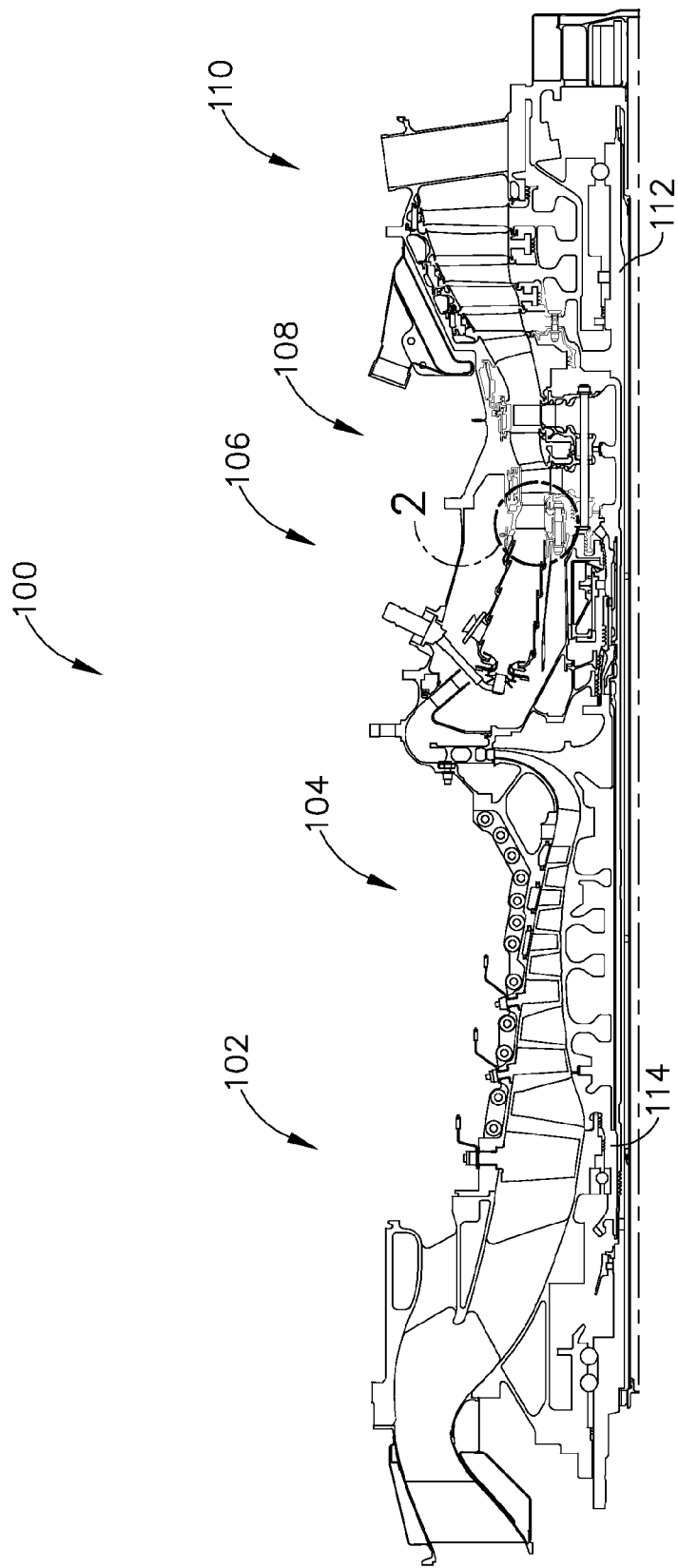
FIG. 1 is a cross-sectional view of an exemplary gas turbine engine.

FIG. 1 illustrates a cross-sectional schematic view of an exemplary gas turbine engine 100. The gas turbine engine 100 may include a low-pressure compressor 102, a high-pressure compressor 104, a combustor 106, a high-pressure turbine 108, and a low-pressure turbine 110. The low-pressure compressor may be coupled to the low-pressure turbine through a shaft 112. The high-pressure compressor 104 may be coupled to the high-pressure turbine 108 through a shaft 114. In operation, air flows through the low-pressure compressor 102 and high-pressure compressor 104. The highly compressed air is delivered to the combustor 106, where it is mixed with a fuel and ignited to generate combustion gases. The combustion gases are channeled from the combustor 106 to drive the turbines 108 and 110. The turbine 110 drives the low-pressure compressor 102 by way of shaft 112. The turbine 108 drives the high-pressure compressor 104 by way of shaft 114.

Figure 2:
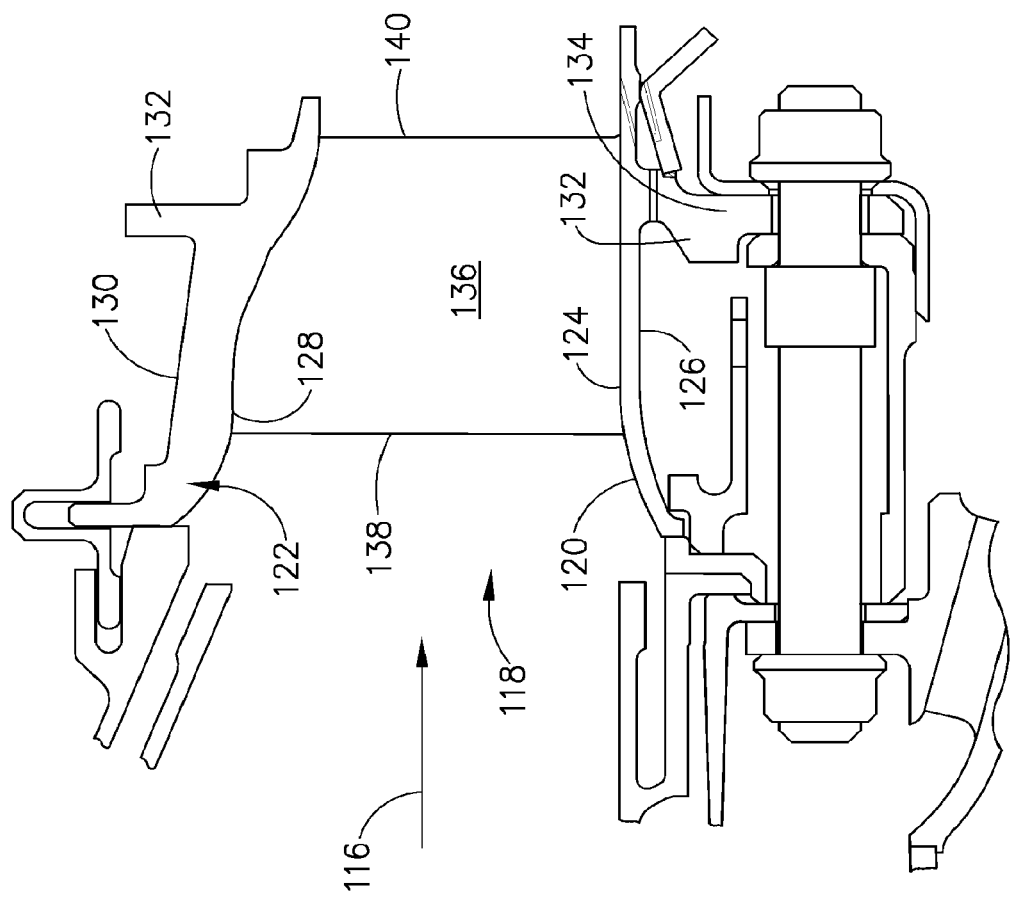
FIG. 2 is a cross sectional view of an exemplary embodiment of a turbine nozzle assembly.
Figure 3:
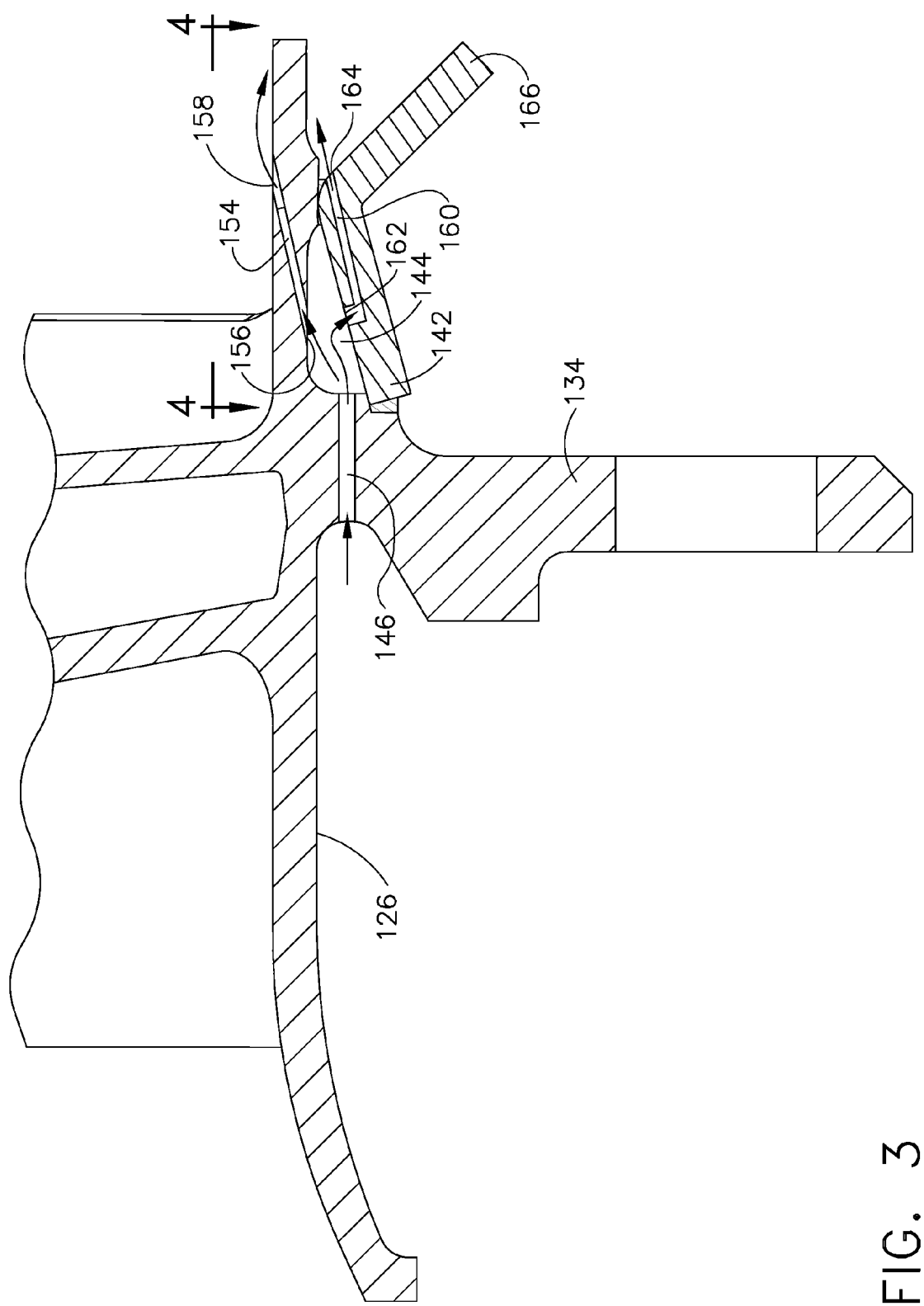
FIG. 3 is close-up cross-sectional view of an exemplary embodiment of a band of a turbine nozzle assembly.

As shown in FIGS. 2-7, the high-pressure turbine 108 may include a turbine nozzle assembly 116. The turbine nozzle assembly 116 may be downstream of the combustor 106 or a row of turbine blades. The turbine nozzle assembly 116 includes an annular array of turbine nozzle segments 118. A plurality of arcuate turbine nozzle segments 118 may be joined together to form the annular turbine nozzle assembly 116. The turbine nozzle segments 118 may have an inner band 120 and an outer band 122, which radially bound the flow of combustion gases through the turbine nozzle assembly 116. The inner band 120 may have a flowpath side 124 and a non-flowpath side 126 and the outer band 122 may have a flowpath side 128 and a non-flowpath side 130. One or more flanges 132 may extend from the non-flowpath sides 128 and 130 of the inner band 120 and outer band 122. For example, as shown in FIGS. 2 and 3, flange 134 extends radially from said the inner band 120 and may be used to attach the turbine nozzle assembly 116 to other components of the gas turbine engine 100.

One or more airfoils 136 extend radially between the inner band 120 and outer band 122 for directing the flow of combustion gases through the turbine nozzle assembly 116. The airfoils 136 have a leading edge 138 on the forward side of the turbine nozzle segment 118 and a trailing edge 140 on the aft side of the turbine nozzle segment 118. The airfoils 136 may be formed of solid or hollow construction. Hollow airfoils may include one or more internal cooling passages for cooling the airfoil and providing film cooling to the airfoil surfaces. Other hollow airfoils may include one or more cavities for receiving a cooling insert. The cooling insert may have a plurality of cooling holes for impinging on the interior surface of the hollow airfoil before exiting as film cooling through holes in the airfoil. Any configuration of airfoil known in the art may be used.

Figure 6:
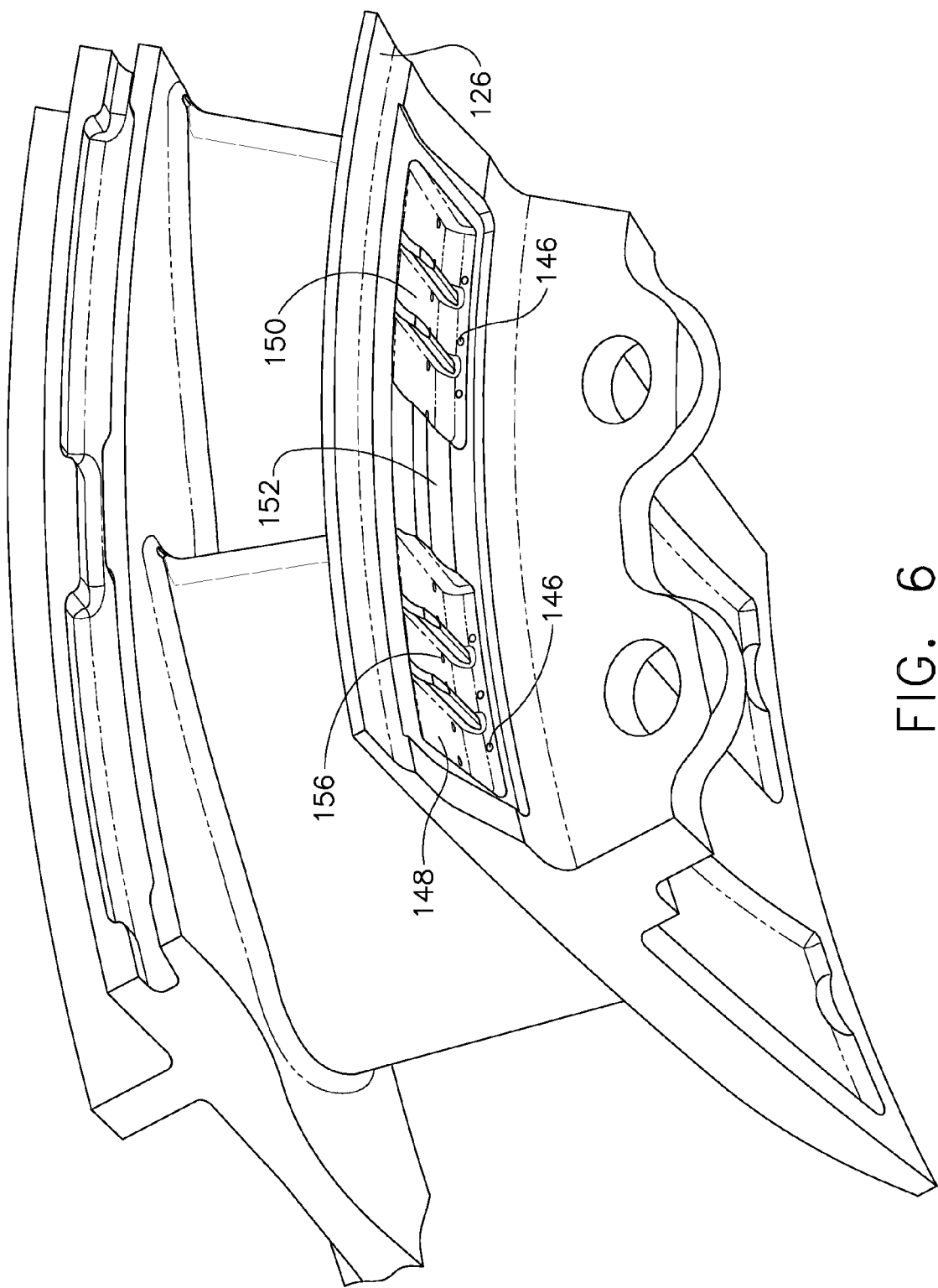
FIG. 6 is another prospective view of an exemplary embodiment of a turbine nozzle segment shown with the enclosure removed.
Figure 7:
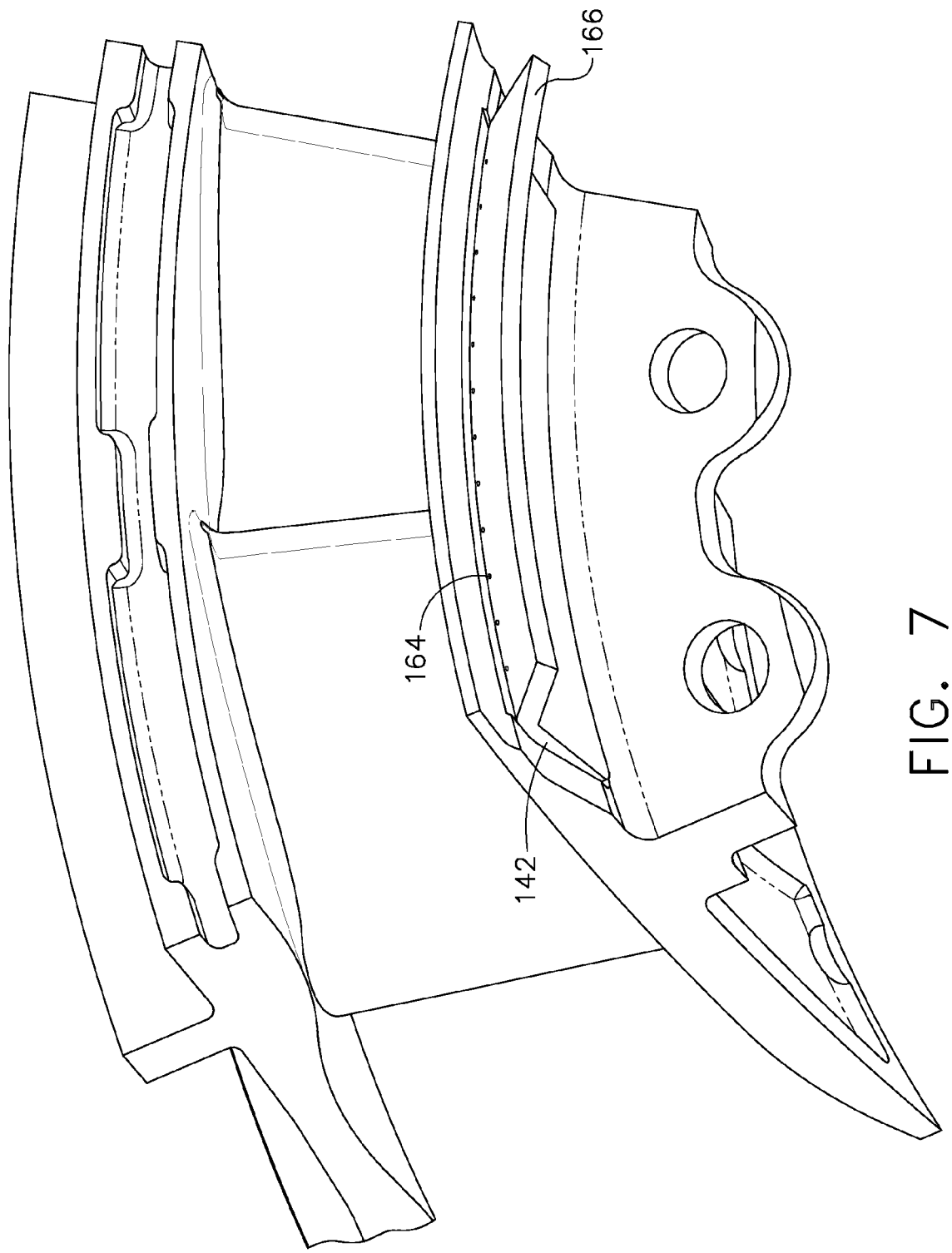
FIG. 7 is another prospective view of an exemplary embodiment of a turbine nozzle segment shown with the enclosure.

Band, as used below, may mean the inner band 120, the outer band 122 or each of the inner band 120 and outer band 122. An enclosure 142 may be associated with the non-flowpath side 126, 130 of the band. The enclosure 142 may be formed integrally with the band or may be attached in any manner known in the art, such as, but not limited to, brazing. In one exemplary embodiment, the enclosure 142 may extend between the non-flowpath side 126, 130 of the band and the flange 132. The enclosure 142, non-flowpath side 126, 130 of the band and the flange 132 may define a plenum 144. The plenum 144 may receive cooling air through one or more holes 146 in the flange 132. Air may be routed to the one or more holes 146 through any manner known in the art. As shown in FIG. 6, the plenum 144 may be formed as two cavities 148 and 150 in the non-flowpath side 126, 130 of the band with a channel 152 connecting therebetween.

Figure 4:
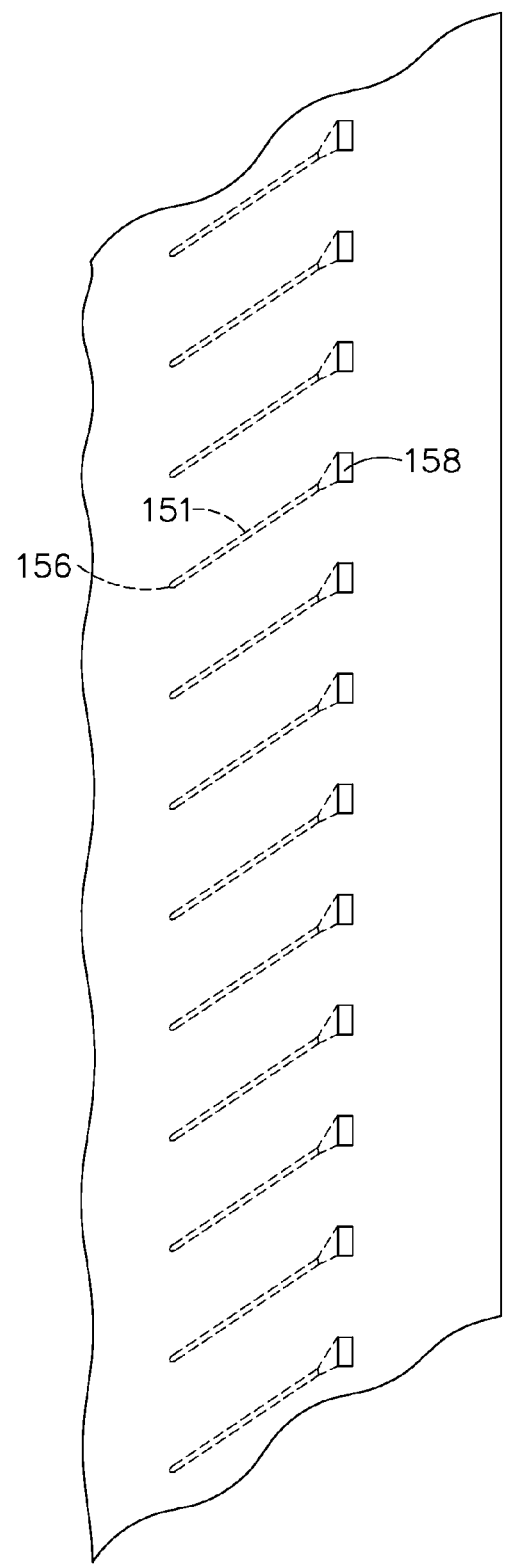
FIG. 4 is a close-up plan view of the flow path side of an exemplary embodiment of a band of a turbine nozzle assembly.
Figure 5:
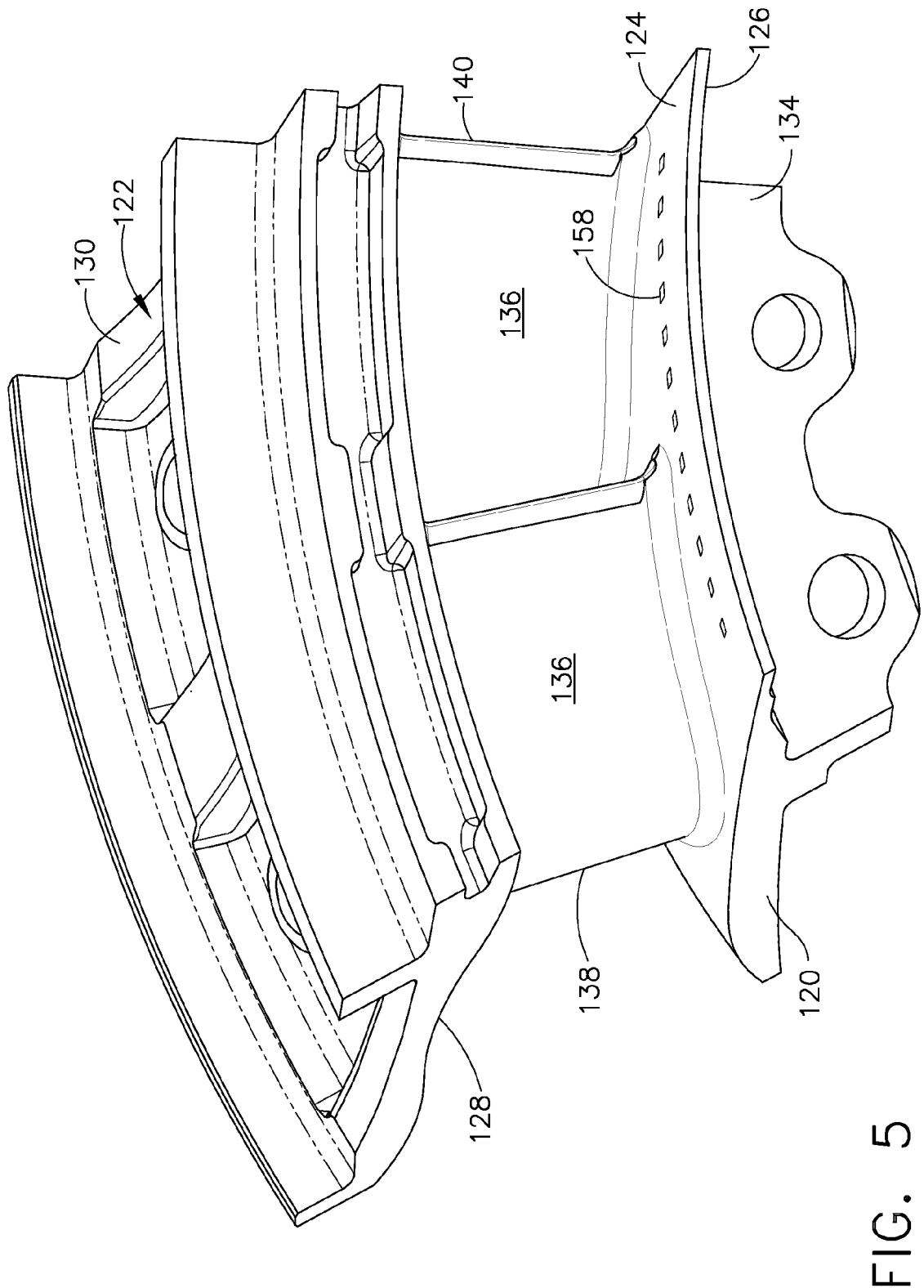
FIG. 5 is a prospective view of an exemplary embodiment of a turbine nozzle segment.

In one exemplary embodiment, the band may have a plurality of cooling holes 154 formed therein. The plurality of cooling holes 154 may have an inlet 156 at the plenum 144 for receiving cooling air therefrom. The plurality of cooling holes 154 may have an outlet 158 for providing film cooling to the flowpath side 124, 128 of the band. In one exemplary embodiment, as shown in FIG. 4, the outlets 158 of the plurality of cooling holes 154 may be flared to increase the amount of film cooling. A plurality of cooling holes 160 may be formed in the enclosure 142. The plurality of cooling holes 160 may have an inlet 162 at the plenum 144 for receiving cooling air therefrom. The plurality of cooling holes 160 may have an outlet 164 for providing impingement cooling to the non-flowpath side 126, 130 of the band. In one exemplary embodiment, a discourager 166 may be associated with the enclosure 142. The discourager 166 may be formed integrally with said enclosure 142 or may be attached in any manner known in the art, such as, but not limited to, brazing. The discourager 166 may act as a shield for the non-flowpath side 126, 130 of the band to keep hot gases away therefrom. In one exemplary embodiment, the enclosure 142, plenum 144, and associated cooling holes may be located on the aft side of the band.

By providing cooling holes in these areas, the metal temperature may be reduced, leading to less distress and less likelihood of forming a crack or hole. As such, the turbine nozzle segment will last longer leading to less repairs and/or replacements over time for the gas turbine engine.

This written description discloses exemplary embodiments, including the best mode, to enable any person skilled in the art to make and use the exemplary embodiments. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine nozzle segment, comprising:
a band having a flowpath side and a non-flowpath side;
an enclosure disposed on said non-flowpath side of said band;
a plenum defined between said band and said enclosure;
said enclosure including a plurality of cooling holes;
said plurality of cooling holes having an inlet at said plenum and an outlet disposed so as to impinge on said non-flowpath side of said band; and
a discourager extending from said enclosure.

2. The turbine nozzle segment of claim 1 wherein said band includes a plurality of cooling holes.

3. The turbine nozzle segment of claim 2 wherein said plurality of cooling holes in said band have an inlet in said plenum.

4. The turbine nozzle segment of claim 3 wherein said plurality of cooling holes in said band have an outlet on said flowpath side of said band.

5. The turbine nozzle segment of claim 4 wherein said outlets for said plurality of cooling holes in said band are flared.

6. The turbine nozzle segment of claim 5 wherein said discourager is integral with said enclosure and said enclosure is brazed to said band.

7. The turbine nozzle segment of claim 1 wherein said discourager is integral with said enclosure and said enclosure is brazed to said band.

8. A turbine nozzle segment, comprising:
a band having a radially extending flange;
an enclosure associated with said band;
a plenum defined between said enclosure and said band;
said enclosure including a plurality of cooling holes;
said plurality of cooling holes having an inlet at said plenum and an outlet disposed so as to impinge on said non-flowpath side of said band; and
a hole extending through said flange, said hole having an outlet into said plenum.

9. The turbine nozzle segment of claim 8 wherein said band includes a plurality of cooling holes.

10. The turbine nozzle segment of claim 9 wherein said plurality of cooling holes in said band have an inlet in said plenum.

11. The turbine nozzle segment of claim 10 wherein said plurality of cooling holes in said band have an outlet on said flowpath side of said band.

12. The turbine nozzle segment of claim 11 wherein said outlets for said plurality of cooling holes in said band are flared.

13. The turbine nozzle segment of claim 12 wherein said enclosure has a discourager extending integrally therefrom and said enclosure is brazed to said band and flange.

14. The turbine nozzle segment of claim 8 wherein said enclosure has a discourager extending integrally therefrom and said enclosure is brazed to said band and flange.

* * * * *